US008810807B2

(12) United States Patent
Oguri

(10) Patent No.: US 8,810,807 B2
(45) Date of Patent: Aug. 19, 2014

(54) DISPLACEMENT DETECTING DEVICE

(75) Inventor: Daisuke Oguri, Kanagawa (JP)

(73) Assignee: Mori Seiki Co., Ltd., Yamato-Koriyama (JP)

( * ) Notice: Subject to any disclaimer, the term of this patent is extended or adjusted under 35 U.S.C. 154(b) by 399 days.

(21) Appl. No.: 13/157,656

(22) Filed: Jun. 10, 2011

(65) Prior Publication Data

US 2011/0310400 A1     Dec. 22, 2011

(30) Foreign Application Priority Data

Jun. 17, 2010   (JP) ................................ 2010-138732

(51) Int. Cl.
*G01B 11/14*     (2006.01)
*G01B 21/04*     (2006.01)

(52) U.S. Cl.
CPC .................................. *G01B 21/045* (2013.01)
USPC ........................................................ 356/624

(58) Field of Classification Search
None
See application file for complete search history.

(56) References Cited

U.S. PATENT DOCUMENTS

| | | | | |
|---|---|---|---|---|
| 4,801,794 A | * | 1/1989 | Kowalski et al. | 250/201.5 |
| 5,015,835 A | * | 5/1991 | Ohuchida et al. | 250/201.5 |
| 5,195,081 A | * | 3/1993 | Usui | 250/201.5 |
| 5,233,444 A | * | 8/1993 | Musha et al. | 359/15 |
| 6,124,924 A | * | 9/2000 | Feldman et al. | 356/153 |
| 6,198,085 B1 | * | 3/2001 | Tateishi | 250/201.5 |
| 2001/0028028 A1 | * | 10/2001 | Iwasaki et al. | 250/216 |
| 2002/0171028 A1 | * | 11/2002 | Feldman | 250/201.2 |
| 2004/0130989 A1 | * | 7/2004 | Hashimoto et al. | 369/53.19 |
| 2009/0051894 A1 | | 2/2009 | Shibazaki | |
| 2009/0103106 A1 | * | 4/2009 | Kimura et al. | 356/521 |
| 2009/0261233 A1 | * | 10/2009 | Tamiya et al. | 356/498 |
| 2009/0262634 A1 | * | 10/2009 | Omori et al. | 369/112.24 |
| 2010/0019126 A1 | * | 1/2010 | Katayama | 250/205 |

FOREIGN PATENT DOCUMENTS

| | | |
|---|---|---|
| JP | 4-65612 A | 3/1992 |
| JP | 5-89480 A | 4/1993 |
| JP | 5-231848 A | 9/1993 |
| JP | 5-322560 A | 12/1993 |
| JP | 7-239216 A | 9/1995 |
| JP | 11-161976 A | 6/1999 |
| JP | 2009-55034 A | 3/2009 |
| JP | 2009-236653 A | 10/2013 |

OTHER PUBLICATIONS

Notification of Reasons for Refusal for Japanese Patent Application No. 2010-138732 mailed on Dec. 17, 2013, with English translation.

* cited by examiner

*Primary Examiner* — Gregory J Toatley
*Assistant Examiner* — Juan D Valentin, II

(57) ABSTRACT

In a displacement detecting device, an objective lens condenses the outgoing light coming from a light source toward a surface-to-be-measured. The optical path of the reflected light coming from the surface-to-be-measured is separated from the optical path of the outgoing light coming from the light source by a separation optical system. The reflected light passing through the separation optical system is condensed by a collimator lens and has astigmatism generated therein by an astigmatism generator, and the reflected light in such a state is incident on a light receiving section. A position information generator generates the position information of the surface-to-be-measured using a focus error signal obtained based on the amount of light detected by the light receiving section. Further, the position of the condenser, the astigmatism generator or the light receiving section in the optical axis is set so that the value of the focus error signal is equal to "0" when the focus of the outgoing light condensed by the objective lens is located on the front side or back side of the surface-to-be-measured.

2 Claims, 5 Drawing Sheets

*FIG. 2A*     *FIG. 2B*     *FIG. 2C*
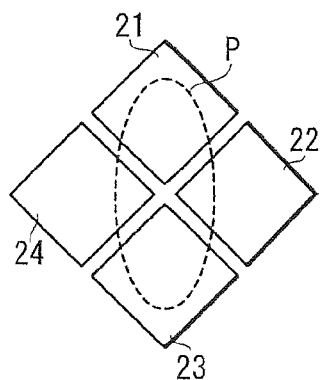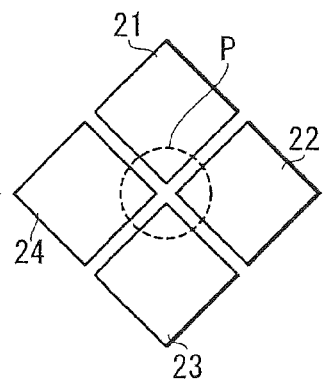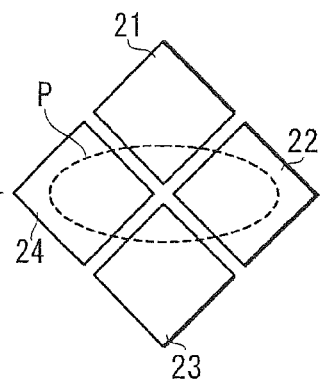
*FIG. 3*
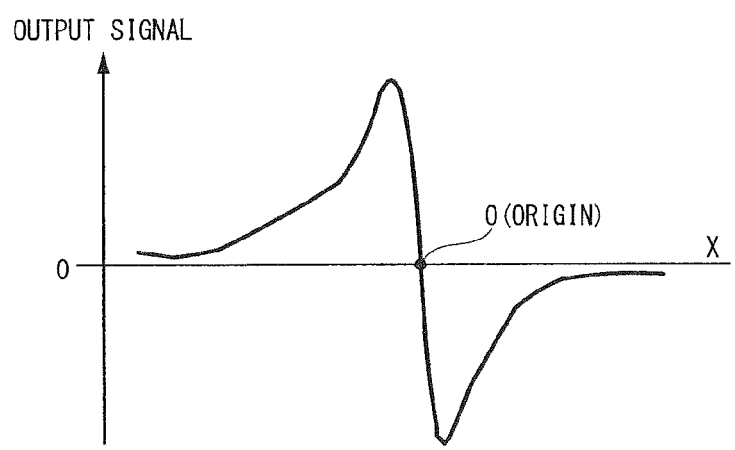

DISPLACEMENT DETECTING DEVICE

CROSS REFERENCES TO RELATED APPLICATIONS

The present invention contains subject matter related to Japanese Patent Application JP 2010-138732 filed in the Japanese Patent Office on Jun. 17, 2010, the entire contents of which being incorporated herein by reference.

BACKGROUND OF THE INVENTION

1. Field of the Invention

The present invention relates to a displacement detecting device for detecting displacement of a surface-to-be-measured by a non-contact sensor which uses light emitted from a light source.

2. Description of the Related Art

Conventionally, a displacement detecting device is widely used as a device for measuring displacement and shape of a surface-to-be-measured. In the conventional displacement detecting device, the light emitted from a light source is condensed toward the surface-to-be-measured by an objective lens, and the reflected light reflected by the surface-to-be-measured is condensed by an astigmatic optical element and incident on a light receiving element so as to generate a focus error signal by an astigmatic method. Further, by using the focus error signal, a servomechanism is driven to displace the objective lens so that focus position of the objective lens is located on the surface-to-be-measured. At this time, the scale of a linear scale integrally attached to the objective lens through a connection member is read to thereby detect the displacement of the surface-to-be-measured (see, for example, Japanese Unexamined Patent Application Publication No. H05-89480).

In the displacement detecting device disclosed in Japanese Unexamined Patent Application Publication No. H05-89480, in order to improve the accuracy of the displacement detection, the NA (Numerical Aperture) of the objective lens is set large so as to reduce the beam diameter condensed on the surface-to-be-measured. For example, when the beam diameter formed on the surface-to-be-measured is about 2 μm, the detection accuracy of the linear scale will be in a range from several nm to a hundred and several nm.

SUMMARY OF THE INVENTION

However, although the displacement detecting device disclosed in Japanese Unexamined Patent Application Publication No. H05-89480 is suitable for performing displacement measurement of fine unevenness, since the light to form an image on the surface-to-be-measured is scattered due to the surface roughness of the surface-to-be-measured, it may cause error in displacement measurement of the surface-to-be-measured.

Further, there are cases where fine dust and the like attached on the surface-to-be-measured is detected, so that it is impossible to accurately obtain required displacement information such as displacement, shape of the surface-to-be-measured. Furthermore, since the light condensed toward the surface-to-be-measured forms an image on the surface-to-be-measured, the temperature of the surface-to-be-measured will rise, and that will influence the measurement and deteriorate the surface-to-be-measured.

In view of the above problems, it is an object of the present invention to provide a displacement detecting device capable of reducing the possibility of error in displacement measurement of the surface-to-be-measured caused by the surface roughness and/or attached foreign matter such as dirt, fine dust and the like.

To achieve the above object, a displacement detecting device according to an aspect of the present invention includes: a light source, an objective lens, a separation optical system, a condenser, an astigmatism generator, a light receiving section, and a position information generator. The objective lens is adapted to condense the outgoing light emitted from the light source toward a surface-to-be-measured, the separation optical system is adapted to separate the optical path of the reflected light coming from the surface-to-be-measured from the optical path of the outgoing light coming from the light source, the condenser is adapted to condense the reflected light separated from the optical path of the outgoing light by the separation optical system, and the astigmatism generator is adapted to generate astigmatism to the reflected light condensed by the condenser.

The light receiving section is adapted to detect the amount of the reflected light to which the astigmatism is generated by the astigmatism generator, and the position information generator is adapted to generate position information of the surface-to-be-measured using a focus error signal obtained based on the amount of the reflected light detected by the light receiving section. Further, the position of the condenser, the astigmatism generator or the light receiving section in the optical axis is set so that the value of the focus error signal is equal to "0" when the focus of the outgoing light condensed by the objective lens is located on the front side or back side of the surface-to-be-measured In the displacement detecting device having the aforesaid configuration, the focus error signal becomes "0" in a state where the focus of the outgoing light condensed by the objective lens form an image on the front side or back side of the surface-to-be-measured, and it is judged that the objective lens is located at the reference position in a state where the focus of the outgoing light is deviated from the surface-to-be-measured. Thus, it is possible to set the diameter of the outgoing light (beam diameter) on the surface-to-be-measured to a predetermined value, so that the surface roughness of the surface-to-be-measured and/or attached foreign matter such as dirt, fine dust and the like are less likely to be detected as the displacement of the surface-to-be-measured. As a result, it is possible to reduce the possibility of error in displacement measurement of the surface-to-be-measured caused by the surface roughness and/or attached foreign matter such as dirt, fine dust and the like.

Further, since the outgoing light is reflected by the surface-to-be-measured, instead of forming an image at one point of the surface-to-be-measured, temperature of the surface-to-be-measured can be prevented or inhibited from rising, and the surface-to-be-measured can be prevented or inhibited from deterioration.

BRIEF DESCRIPTION OF THE DRAWINGS

FIGS. 2A to 2C are views each showing an example of an irradiation image formed on a light receiving section of the displacement detecting device according to the first embodiment of the present invention;

FIG. 3 is a graph showing the characteristic of a focus error signal obtained based on the amount of light detected by the light receiving section of the displacement detecting device according to the first embodiment of the present invention;

DETAILED DESCRIPTION OF THE PREFERRED EMBODIMENTS

Figure 1:
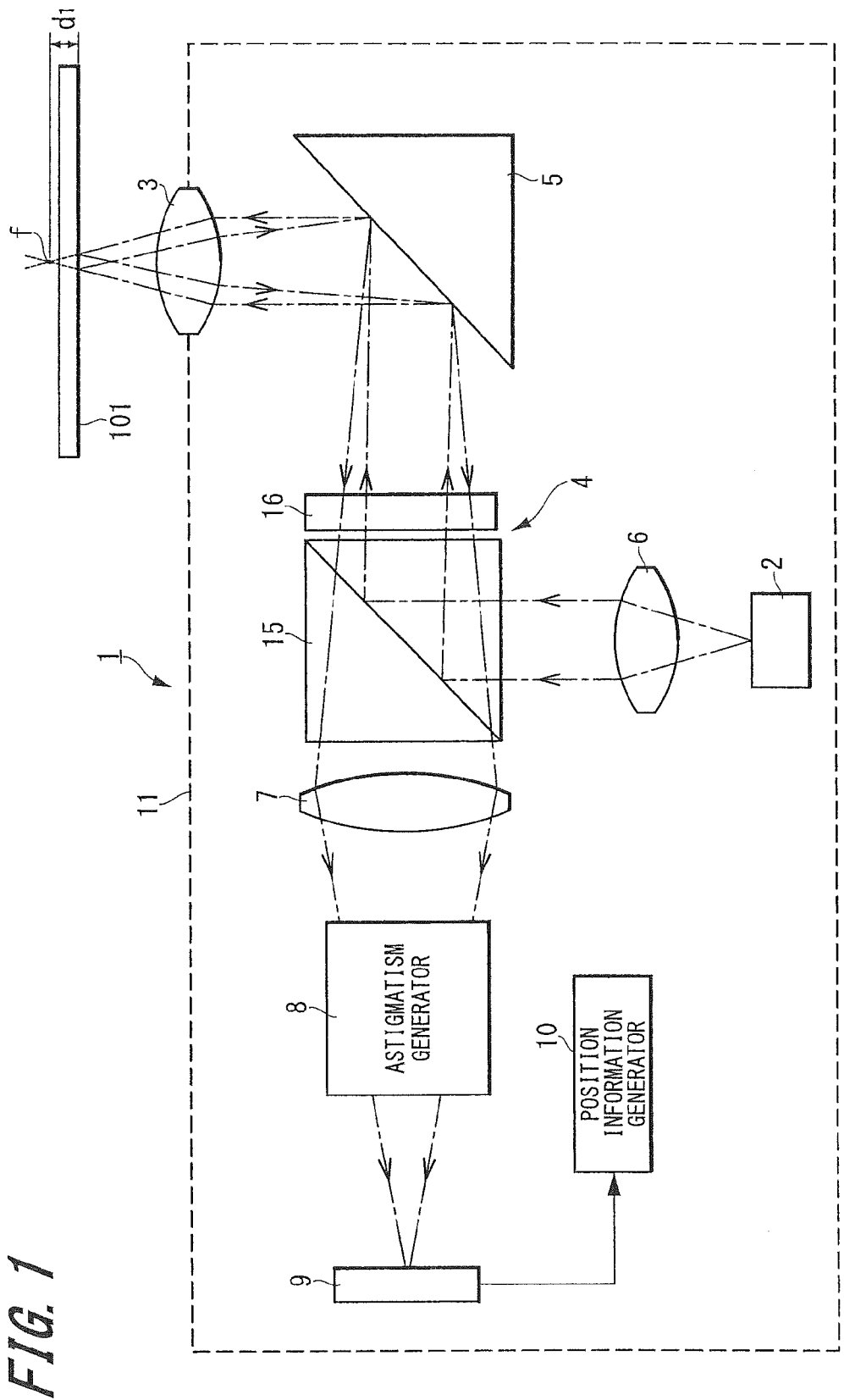
FIG. 1 is a block diagram showing a displacement detecting device according to a first embodiment of the present invention.

Preferred embodiments implementing the displacement detecting device of the present invention will be described below with reference to FIGS. 1 to 6. Note that, in the drawings, like components are denoted by like reference numerals.

<1. Displacement Detecting Device According to First Embodiment>

First, a displacement detecting device according to a first embodiment of the present invention will be described below with reference to FIG. 1.

FIG. 1 is a block diagram showing a displacement detecting device 1 according to the first embodiment of the present invention.

As shown in FIG. 1, the displacement detecting device 1 includes a light source 2, an objective lens 3, a separation optical system 4, a mirror 5, two collimator lenses 6, 7, an astigmatism generator 8, a light receiving section 9, a position information generator 10, and a case 11. The light source 2, the objective lens 3, the separation optical system 4, the mirror 5, the two collimator lenses 6, 7, the astigmatism generator 8, the light receiving section 9 and the position information generator 10 are disposed in the case 11.

The light source 2 is configured by, for example, a semiconductor laser diode, a super luminescent diode or the like. The light source 2 is detachably attached to the case 11. Since the light source 2 is detachably attached to the case 11, when the light source 2 is deteriorated, the deteriorated light source 2 can be changed with a new one without removing the case 11 from the place where it is installed. Thus, every time when changing the light source 2, there is no concern that the installation position of the case 11 might be out of alignment, and that will be an advantage in the case where the displacement detecting device 1 is used in a measuring device or a manufacturing device which demands high reliability.

The objective lens 3 condenses the outgoing light coming from the light source 2 toward a surface-to-be-measured 101. The objective lens 3 is fixed to a lens holder (not shown), and the lens holder can be moved by an actuator (not shown) in the optical axis direction of the objective lens 3. The actuator for moving the lens holder can be configured by, for example, a movable coil and permanent magnet.

Further, a linear scale (not shown) is fixed to the lens holder. The scale of the linear scale is arranged coaxially with the optical axis of the objective lens 3. For example, an optical scale (hologram scale) having optical interference fringes marked thereon as the scale, a magnetic scale or the like can be used as the linear scale. Incidentally, the linear scale may have an origin (a reference point) formed substantially at the central position of the scale thereof.

The separation optical system 4 is configured by a polarizing beam splitter 15 and a phase plate 16, and is adapted to separate the optical path of the reflected light coming from the surface-to-be-measured 101 and the optical path of the outgoing light coming from the light source 2. The polarizing beam splitter 15 reflects the outgoing light coming from the light source 2 and transmits the reflected light reflected by the surface-to-be-measured 101. The phase plate 16 is arranged between the polarizing beam splitter 15 and the mirror 5, and is adapted to change the polarization state of the outgoing light reflected by the polarizing beam splitter and the reflected light reflected by the surface-to-be-measured 101.

The mirror 5 is adapted to change the optical axis direction of the outgoing light reflected by the polarizing beam splitter 15 and the reflected light reflected by the surface-to-be-measured 101. To be specific, the mirror 5 causes the optical axis of the outgoing light reflected by the polarizing beam splitter 15 to extends toward the objective lens 3 and causes the optical axis of the reflected light reflected by the surface-to-be-measured 101 to extend toward to the phase plate 16 (i.e., toward to polarizing beam splitter 15).

The mirror 5 has a metal film formed on a surface thereof. Thus, change in wavelength characteristic and polarization property due to change in humidity, which will be caused by a general dielectric multilayer, can be suppressed, so that it is possible to perform position detection with stability.

The collimator lens 6 is arranged between the light source 2 and the polarizing beam splitter 15 and is adapted to convert the outgoing light emitted from the light source 2 into parallel light. The collimator lens 7 is arranged between the polarizing beam splitter 15 and the astigmatism generator 8. The collimator lens 7 is a concrete example of a condenser, and is adapted to condense the reflected light transmitted through the polarizing beam splitter 15 and guide the condensed light to the light receiving section 9.

Incidentally, the objective lens 3 and the collimator lenses 6, 7 may be subjected to achromatism (correction of chromatic aberration) so that the influence exerted by variation in focal length caused by wavelength variation of the light source 2 becomes less. With such an arrangement, it is not necessary to monitor the wavelength and temperature of the light source 2, and it is not necessary to correct the measurement value obtained by measuring the displacement of the surface-to-be-measured 101.

Further, in the present embodiment, the collimator lens 6 is arranged in the optical path of the outgoing light emitted from the light source 2, and the collimator lens 7 is arranged in the optical path of the reflected light reflected by the surface-to-be-measured 101. With such an arrangement, it is possible to arbitrarily set the optical path length of the outgoing light and the optical path length of the reflected light. As a result, it is possible to improve design freedom and achieve optimal component layout. Further, owing to the provision of the collimator lens 6, it is possible to improve coupling efficiency; and owing to the provision of the collimator lens 7, it is possible to change the characteristic of a focus error signal (which is to be described later) to, for example, increase driving range of a servomechanism (servo pull-in range) for displacing the objective lens 3.

The astigmatism generator 8 is arranged between the collimator lens 7 and the light receiving section 9, and is adapted to generate astigmatism to the reflected light reflected by the surface-to-be-measured 101 and condensed by the collimator lens 7. The astigmatism generator 8 is configured by an optical component arranged in the optical path of the reflected light between the collimator lens 7 and the light receiving section 9, the optical component having a cylindrical surface. Typically, a cylindrical lens is used as an astigmatism generator; however, in the present embodiment, a multi-lens obtained by combining a spherical surface and a cylindrical surface is used as the astigmatism generator. Thus, it is possible to generate astigmatism and adjust the waveform of the output signal, so that the number of components can be reduced.

Incidentally, the astigmatism generator 8 of the present embodiment may also be configured by a transparent substrate obliquely arranged in the optical path of the reflected light between the collimator lens 7 and the light receiving section 9.

The light receiving section 9 is adapted to detect the reflected light, which has the astigmatism generated therein by the astigmatism generator 8. The light receiving section 9 is configured by four light receiving elements 21 to 24 arranged in a plane perpendicular to the optical axis of the reflected light (see FIGS. 2A to 2C). Since the astigmatism is generated in the reflected light, the irradiation image of the reflected light incident on the four light receiving elements 21 to 24 will change according to the distance between the objective lens 3 and the surface-to-be-measured 101. The shape of the irradiation image (the irradiation spot) will be described later.

The position information generator 10 generates position information of the surface-to-be-measured 101 using the focus error signal obtained by the light receiving section 9. The position information generator 10 is configured by a focus error signal generator (not shown), a servo control circuit (not shown), the aforesaid actuator, the aforesaid linear scale, and a detection head (not shown) adapted to read the scale of the linear scale.

When the value of the focus error signal is equal to "0", the focus position of the outgoing light condensed by the objective lens 3 is determined by the positions of the collimator lens (the condenser) 7, the astigmatism generator 8 and the light receiving section 9 in the optical axis direction. In the present embodiment, the position of the collimator lens 7, the astigmatism generator 8 or the light receiving section 9 in the optical axis direction is set so that the value of the focus error signal becomes "0" when the focus position of the outgoing light condensed by the objective lens 3 is located on the back side of the surface-to-be-measured 101.

Next, the displacement measurement of the surface-to-be-measured 101 performed by the displacement detecting device 1 will be described below with reference to FIGS. 1 to 3.

FIGS. 2A to 2C are views each showing an example of the irradiation image formed the light receiving section of the displacement detecting device 1. FIG. 3 is a graph showing the characteristic of the focus error signal obtained based on the amount of light detected by the light receiving section.

As shown in FIG. 1, the outgoing light emitted from the light source 2 is converted into the parallel light by the collimator lens 6 and reflected by the polarizing beam splitter 15. The outgoing light emitted from the light source 2 and reflected by the polarizing beam splitter 15 passes through the phase plate 16 where the light is converted into circularly polarized light, and the circularly polarized light is reflected by the mirror 5 so as to be guided to the objective lens 3. Thereafter, the outgoing light is condensed by the objective lens 3 toward the surface-to-be-measured 101 to form an image after being reflected by the surface-to-be-measured 101. Thus, the outgoing light on the surface-to-be-measured 101 has a predetermined diameter (beam diameter).

The reflected light reflected by the surface-to-be-measured 101 passes through the objective lens 3 where the light becomes closer to parallel light, yet it is still divergent light. Such divergent light is reflected by the mirror 5 so as to be guided to the phase plate 16. The reflected light having passed through the phase plate 16 becomes linearly polarized light perpendicular to the outgoing light before passing through the phase plate 16, and is transmitted through the polarizing beam splitter 15. Thereafter, the reflected light is condensed by the collimator lens 7 and has the astigmatism generated therein by the astigmatism generator 8, and in such a state, the reflected light is irradiated onto the light receiving section 9.

As shown in FIGS. 2A to 2C, the light receiving section 9 is configured by the four light receiving elements 21 to 24 which are arranged in a plane perpendicular to the optical axis of the reflected light. The four light receiving elements 21 to 24 are arranged around the optical axis of the reflected light spaced apart from each other with a predetermined distance. The light receiving element 21 and the light receiving element 23 face each other with the optical axis of the reflected light in between. Further, the light receiving element 22 and the light receiving element 24 face each other with the optical axis of the reflected light in between.

On the four light receiving elements 21 to 24, the area irradiated by the reflected light having the astigmatism generated therein (i.e., the irradiation spot) changes according to the distance between the objective lens 3 and the surface-to-be-measured 101. In the present embodiment, the irradiation spot becomes round shape (see FIG. 2B) when the focus position f of the outgoing light condensed by the objective lens 3 is located on the back side of the surface-to-be-measured 101 at a position away from the surface-to-be-measured 101 by a predetermined distance $d_1$. Thus, in the case where the irradiation spot becomes round shape, the outgoing light condensed by the objective lens 3 forms an image after being reflected by the surface-to-be-measured 101.

Here, the position of the objective lens 3 when the irradiation spot becomes round shape is defined as a reference position. In the present embodiment, when the objective lens 3 is moved farther away from the surface-to-be-measured 101 than the reference position, the irradiation spot will become an oval shape extending toward the side of the light receiving elements 21, 23 (see FIG. 2A), while when the objective lens 3 is moved closer the surface-to-be-measured 101 than the reference position, the irradiation spot will become an oval shape extending toward the side of the light receiving elements 22, 24 (see FIG. 2C).

Each of the light receiving elements 21 to 24 converts the detected light into electrical energy (i.e., photoelectric conversion) to generate an output signal, and outputs the output signal to the focus error signal generator of the position information generator 10. The focus error signal generator generates a focus error signal $S_{FE}$ based on the output signal outputted by each of the light receiving elements 21 to 24. The focus error signal $S_{FE}$ represents the deviation of the objective lens 3 in the optical axis direction from the reference position.

Assuming the output signals of the light receiving elements 21, 22, 23, 24 are respectively output signals A, B, C, D, then the focus error signal $S_{FE}$ can be calculated by the following equation:

$$S_{FE}(A+C)-(B+D) \qquad \text{[Equation 1]}$$

The characteristic of the focus error signal $S_{FE}$ calculated by Equation 1 is shown in FIG. 3. In the characteristic graph shown in FIG. 3, the origin O represents the reference position of the objective lens 3, and a predetermined diameter of the outgoing light (the beam diameter) on the surface-to-be-measured 101 can be reliably obtained. Thus, despite the surface roughness smaller than the beam diameter and/or attached foreign matter (such as dirt, fine dust and the like) smaller than the beam diameter, the value of the focus error signal $S_{FE}$ will be "0", and no influence will be exerted on the displacement measurement of the surface-to-be-measured 101.

The focus error signal generator of the position information generator 10 performs an analog-to-digital conversion on the focus error signal $S_{FE}$, and outputs the concerted result to the servo control circuit. The servo control circuit outputs a drive signal to the actuator to control the driving of the actuator, wherein the drive signal is a signal which makes the value of the focus error signal $S_{FE}$ become "0". Thus, the linear scale fixed to the lens holder moves in the optical axis direction of the objective lens 3. Further, the detection head reads the scale of the linear scale to thereby measure the displacement of the surface-to-be-measured 101.

Next, the procedure of setting the positions of the collimator lens 7, the astigmatism generator 8 or the light receiving section 9 in the optical axis direction will be described below.

In the present embodiment, if the light receiving section 9 (the light receiving elements 21 to 24) in the state where the irradiation spot is in round shape is moved along the optical axis so that the light receiving section 9 becomes closer to the astigmatism generator 8, the irradiation spot will become an oval shape extending toward the side of the light receiving elements 21, 23 (see FIG. 2A).

In the case where the reference position of the objective lens 3 is moved close to the surface-to-be-measured 101 to set the focus position f on the back side of the surface-to-be-measured 101, for example, the installation position of the light receiving section 9 (the light receiving elements 21 to 24) is moved farther away from the astigmatism generator 8. As a result, the irradiation spot, which was in round shape in the position of the light receiving section 9 before setting, becomes oval shape extending toward the side of the light receiving elements 21, 23.

The servo control circuit controls the driving of the actuator so that after setting, the irradiation spot on the position of the light receiving section 9 becomes the round shape (i.e., the value of the focus error signal $S_{FE}$ becomes "0"). In the present embodiment, it is judged that the objective lens 3 is located farther away from the surface-to-be-measured 101 than the reference position if the irradiation spot becomes the oval shape extending toward the side of the light receiving elements 21, 23, therefore the actuator is controlled to drive the objective lens 3 close to the surface-to-be-measured 101. As a result, the relative distance between the objective lens 3 and the surface-to-be-measured 101 can be changed, and the focus position f can be set on the back side of the surface-to-be-measured 101.

In the example described above, the position of the light receiving section 9 (the light receiving elements 21 to 24) in the optical axis is adjusted to set the focus position f on the back side of the surface-to-be-measured. However, as the displacement measuring device of the present invention, it is also possible to adjust the position of the astigmatism generator or the condenser (the collimator lens 7) in the optical axis to set the focus position f on the back side of the surface-to-be-measured.

Incidentally, in the case where an optical component having a cylindrical surface (for example, a cylindrical lens) is used as the astigmatism generator, when the position of the astigmatism generator on the optical axis is adjusted, the irradiation spot of the reflected light irradiated onto the four light receiving elements 21 to 24 of the light receiving section 9 will change. Thus, it is possible to change the focus position f of the outgoing light condensed by the objective lens 3.

However, in the case where a substrate is used as the astigmatism generator, the irradiation spot of the reflected light irradiated onto the four light receiving elements 21 to 24 of the light receiving section 9 will not change even adjusting the position of the astigmatism generator on the optical axis. Thus, in the case where a substrate is used as the astigmatism generator, the position of the light receiving section or the condenser on the optical axis is adjusted to change the focus position f.

In the present embodiment, the focus position f of the outgoing light condensed by the objective lens 3 is set on the back side of the surface-to-be-measured 101. Thus, the reflected light reflected by the surface-to-be-measured 101 and passing through the objective lens 3 is divergent light.

Figure 4:
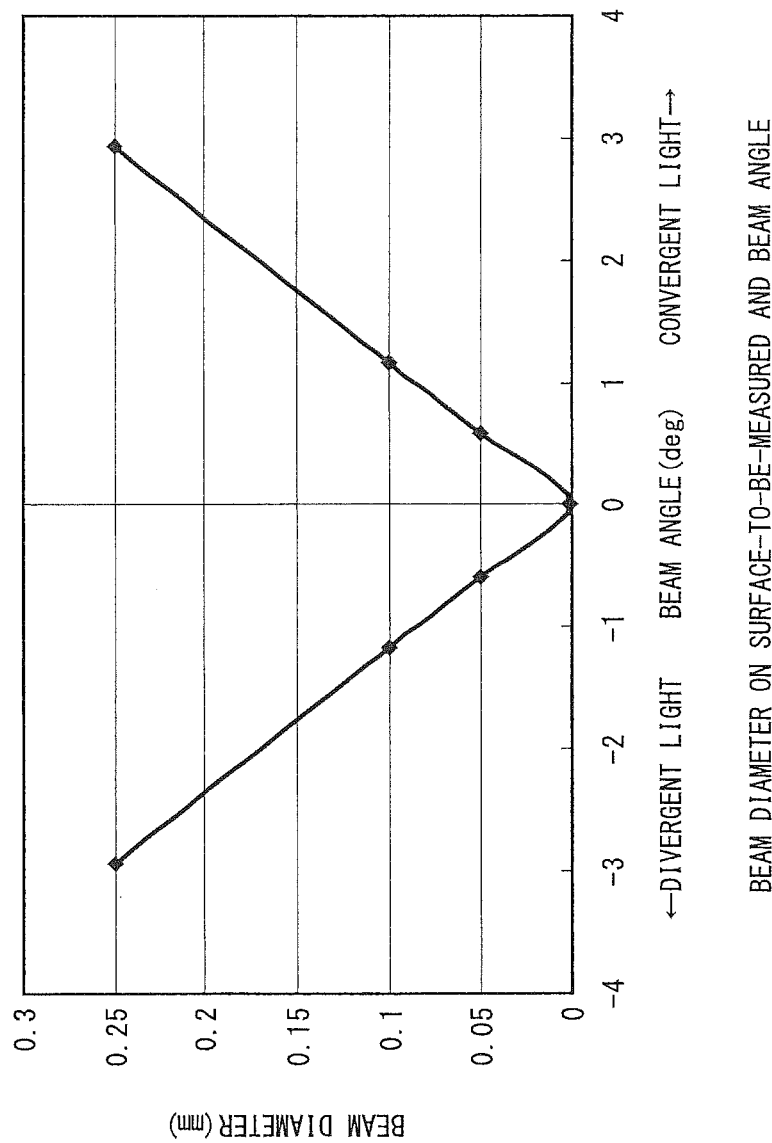
FIG. 4 is a graph showing the relationship between the beam diameter on a surface-to-be-measured according to the first embodiment of the present invention and the angle of divergent light (convergent light)

FIG. 4 is a graph showing the relationship between the beam diameter on the surface-to-be-measured and the angle of divergent light (convergent light).

As shown in FIG. 4, the beam diameter is proportional to the angle of the divergent light. Incidentally, the relationship between the beam diameter and the angle of the divergent light (i.e., the constant of proportion) shown in FIG. 4 is merely an example, and such relationship changes according to focal length, NA (numerical aperture) and the like of the objective lens.

If the beam diameter of the surface-to-be-measured 101 is increased, although it is possible to reduce the influence of the surface roughness of the surface-to-be-measured 101 and/or flaw, dust and the like on the surface-to-be-measured 101, the divergent angle of the reflected light reflected by the surface-to-be-measured 101 and passing through the objective lens 3 will increase. If the divergent angle of the reflected light passing through the objective lens 3 becomes too large, there is a possibility that the optical components, such as the polarizing beam splitter 15, the collimator lens 7 and the like, for guiding the reflected light to the light receiving section 9 may have to be made large. Thus, it is preferred that the beam diameter on the surface-to-be-measured 101 is determined taking into consideration the size of the optical components such as the polarizing beam splitter 15, the collimator lens 7 and the like.

<2. Displacement Detecting Device According to Second Embodiment>

Next, a displacement detecting device according to a second embodiment of the present invention will be described below with reference to FIG. 5.

Figure 5:
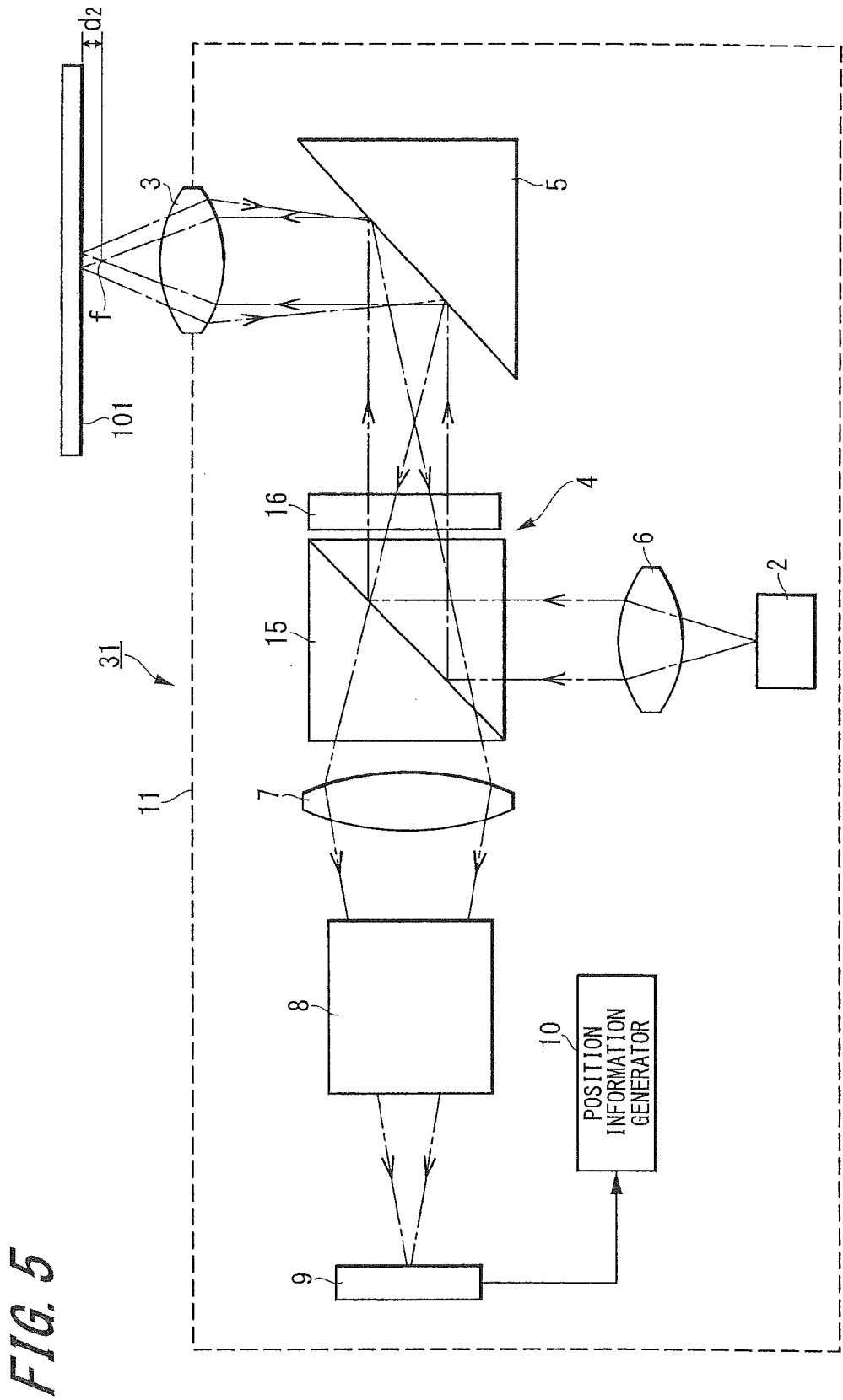
FIG. 5 is a block diagram showing a displacement detecting device according to a second embodiment of the present invention.

FIG. 5 is a block diagram showing a displacement detecting device 31 according to the second embodiment of the present invention.

The configuration of the displacement detecting device 31 of the second embodiment is identical to that of the displacement detecting device 1 (see FIG. 1) of the first embodiment except for the focus position of the outgoing light condensed by the objective lens. Thus, in the second embodiment, description is given for the focus position, and like components are denoted by like reference numerals as of the displacement detecting device 1 and the explanation thereof will be omitted.

In the displacement detecting device 31, the position of the collimator lens 7, the astigmatism generator 8 or the light receiving section 9 in the optical axis direction is set so that the value of the focus error signal becomes "0" when the focus position of the outgoing light condensed by the objective lens 3 is located on the front side (i.e., the side of the objective lens 3) of the surface-to-be-measured 101.

In the present embodiment, the irradiation spot becomes round shape (see FIG. 2B) when the focus position f of the outgoing light condensed by the objective lens 3 is located on the front side of the surface-to-be-measured 101 at a position away from the surface-to-be-measured 101 by a predetermined distance $d_2$. Thus, in the case where the irradiation spot becomes round shape, the outgoing light condensed by the objective lens 3 forms an image on the front side of the surface-to-be-measured 101.

As shown in FIG. 5, the outgoing light emitted from the light source 2 is converted into the parallel light by the collimator lens 6 and reflected by the polarizing beam splitter 15. The outgoing light emitted from the light source 2 and reflected by the polarizing beam splitter 15 passes through the phase plate 16 where the light is converted into circularly polarized light, and the circularly polarized light is reflected by the mirror 5 so as to be guided to the objective lens 3. Thereafter, the outgoing light is condensed toward the surface-to-be-measured 101 by the objective lens 3 to form an image on the front side of the surface-to-be-measured 101.

Thus, the outgoing light on the surface-to-be-measured 101 has a predetermined diameter (beam diameter). Thus, despite the surface roughness smaller than the beam diameter and/or attached foreign matter (such as dirt, fine dust and the like) smaller than the beam diameter, the value of the focus error signal $S_{FE}$ will be "0", and no influence will be exerted on the displacement measurement of the surface-to-be-measured 101.

Next, the procedure of setting the position of the collimator lens 7, the astigmatism generator 8 or the light receiving section 9 in the optical axis direction will be described below.

In the case where the reference position of the objective lens 3 is moved farther away from the surface-to-be-measured 101 to set the focus position f on the front side of the surface-to-be-measured 101, for example, the installation position of the light receiving section 9 (the light receiving elements 21 to 24) is moved closer to the astigmatism generator 8. Thus, the irradiation spot, which was in round shape in the position of the light receiving section 9 before setting, becomes oval shape extending toward the side of the light receiving elements 22, 24.

The servo control circuit controls the driving of the actuator so that after setting, the irradiation spot in the position of the light receiving section 9 becomes the round shape (i.e., the value of the focus error signal $S_{FE}$ becomes "0"). In the present embodiment, it is judged that the objective lens 3 is located closer to the surface-to-be-measured 101 than the reference position if the irradiation spot becomes the oval shape extending toward the side of the light receiving elements 22, 24, therefore the actuator is controlled to drive the objective lens 3 away from the surface-to-be-measured 101. As a result, the relative distance between the objective lens 3 and the surface-to-be-measured 101 can be changed, and the focus position f can be set on the front side of the surface-to-be-measured 101.

In the example described above, the position of the light receiving section 9 (the light receiving elements 21 to 24) in the optical axis is adjusted to set the focus position f on the front side of the surface-to-be-measured. However, as the displacement measuring device of the present invention, it is also possible to adjust the position of the astigmatism generator or the condenser (the collimator lens 7) in the optical axis to set the focus position f on the front side of the surface-to-be-measured. Further, in the case where a substrate is used as the astigmatism generator, the position of the light receiving section or the condenser on the optical axis is adjusted to change the focus position f.

In the present embodiment, since the focus position f of the outgoing light condensed by the objective lens 3 is set on the front side of the surface-to-be-measured 101, the reflected light reflected by the surface-to-be-measured 101 and passing through the objective lens 3 is convergent light. As shown in FIG. 4, the beam diameter is proportional to the angle of the convergent light. Incidentally, the relationship between the beam diameter and the angle of the convergent light (i.e., the constant of proportion) shown in FIG. 4 is merely an example, and such relationship changes according to the focal length of the objective lens, the NA (numerical aperture) and the like of the objective lens.

If the beam diameter of the surface-to-be-measured 101 is increased, the convergent angle of the reflected light reflected by the surface-to-be-measured 101 and passing through the objective lens 3 will increase. If the convergent angle of the reflected light passing through the objective lens 3 becomes large, there is possibility that the reflected light may form an image between the objective lens 3 and the light receiving section 9. In such a case, no optical component shall be disposed near the place where the reflected light forms image. This is because if there is dust adhered on the optical component, large influence will be exerted on the reflected light guided to the light receiving section 9.

Further, if the convergent angle of the reflected light becomes large, lens curvature of the lens components such as the collimator lens 7, the astigmatism generator 8 and the like for guiding the reflected light to the light receiving section 9 will be small, and therefore perturbation sensitivity, such as beam movement when the lens is brought out of alignment, will be increased. Thus, it is preferred that the beam diameter on the surface-to-be-measured 101 is determined taking into consideration the lens curvature of the lens components such as the collimator lens 7, the astigmatism generator 8 and the like.

<3. Displacement Detecting Device According to Third Embodiment>

Next, a displacement detecting device according to a third embodiment of the present invention will be described below with reference to FIG. 6.

Figure 6:
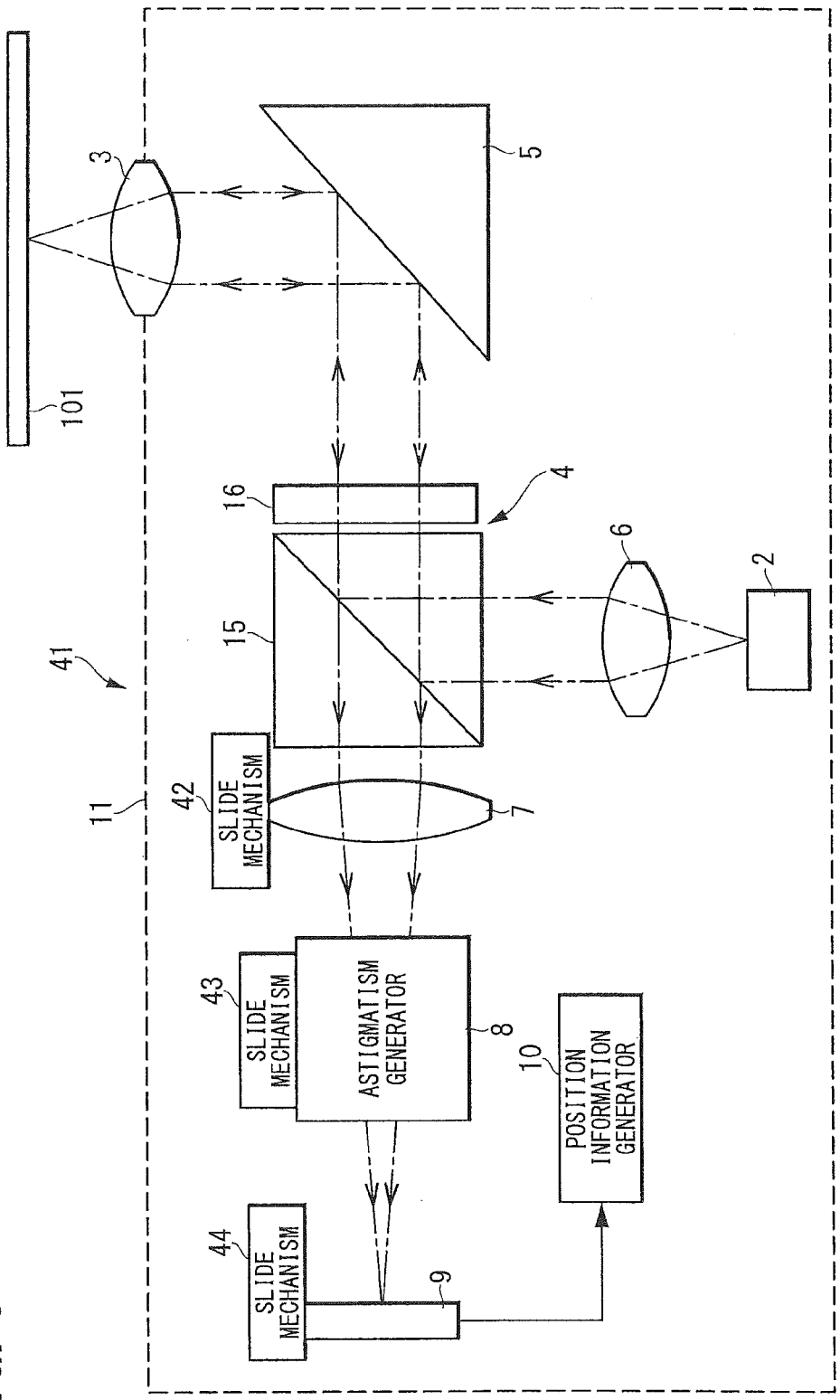
FIG. 6 is a block diagram showing a displacement detecting device according to a third embodiment of the present invention.

FIG. 6 is a block diagram showing a displacement detecting device 41 according to the third embodiment of the present invention.

The configuration of the displacement detecting device 41 of the third embodiment is identical to that of the displacement detecting device 1 (see FIG. 1) of the first embodiment except that the displacement detecting device 41 is further provided with slide mechanisms 42, 43, 44 for respectively moving the collimator lens 7, the astigmatism generator 8 and the light receiving section 9 in the optical axis direction. Thus, in the third embodiment, description is given for the slide mechanisms 42, 43, 44, and like components are denoted by like reference numerals as of the displacement detecting device 1 and the explanation thereof will be omitted.

As shown in FIG. 6, the displacement detecting device 41 has the slide mechanism 42 for moving the collimator lens 7 in the optical axis direction, the slide mechanism 43 for moving the astigmatism generator 8 in the optical axis direction, and the slide mechanism 44 for moving the light receiving section 9 in the optical axis direction. Each of the slide mechanisms 42 to 44 is configured by, for example, an actuator and a guide section, wherein the actuator is adapted to move the optical components such as the collimator lens 7 and the like, and the guide section is adapted to guide the movement of the optical components such as the collimator lens 7 and the like in the optical axis direction. For example, a movable coil and permanent magnet, a linear motor, a piezoelectric element or the like may be used as the actuator of each of the slide mechanisms 42 to 44.

In the present embodiment, the position of the collimator lens 7, the astigmatism generator 8 and the light receiving section 9 on the optical axis can be adjusted by the slide mechanisms 42 to 44. Thus, the position of the collimator lens 7, the astigmatism generator 8 or the light receiving section 9 can be set so that the irradiation spot becomes round shape (see FIG. 2B) when the focus position f of the outgoing light condensed by the objective lens 3 is located on the front side or back side of the surface-to-be-measured 101. As a result, despite the surface roughness smaller than the beam diameter and/or attached foreign matter (such as dirt, fine dust and the like) smaller than the beam diameter, the value of the focus error signal $S_{FE}$ will be "0", and no influence will be exerted on the displacement measurement of the surface-to-be-measured 101.

Further, the position of the collimator lens 7, the astigmatism generator 8 or the light receiving section 9 may also be set so that the irradiation spot becomes round shape (see FIG. 2B) when the focus position f of the outgoing light condensed by the objective lens 3 is located on the surface-to-be-measured 101. In such a case, it is advantageous to measure the fine shape of the surface-to-be-measured 101 by reducing the beam diameter. To be specific, in the displacement detecting device 41, by adjusting the position of the collimator lens 7, the astigmatism generator 8 and the light receiving section 9 on the optical axis, it is possible to perform the displacement measurement of the surface-to-be-measured 101 with an accuracy determined according to use conditions.

In the present embodiment, the slide mechanisms 42 to 43 are provided for respectively moving the collimator lens 7, the astigmatism generator 8 and the light receiving section 9 in the optical axis direction. However, the displacement detecting device according to the present invention may also be provided with one slide mechanism for moving any one of the collimator lens 7, the astigmatism generator 8 and the light receiving section 9 in the optical axis direction.

Further, in the case where a substrate is used as the astigmatism generator, since the irradiation spot of the reflected light irradiated onto the four light receiving elements 21 to 24 does not change, a slide mechanism is provided for moving the light receiving section or the condenser in the optical axis direction.

It is to be understood that the present invention is not limited to the embodiments described above and shown in the attached drawings, and various modifications can be made without departing from the spirit and scope of the present invention. For example, in the aforesaid embodiments, the outgoing light emitted from the light source 2 is converted into the parallel light by the collimator lens 6; however, the outgoing light emitted from the light source 2 and passing through the collimator lens 6 may also be divergent light or convergent light.

Further, in the aforesaid embodiments, the objective lens 3 is moved in the optical axis direction following the surface-to-be-measured 101; however, the objective lens 3 may also be fixed to the case 11, and thereby the absolute position information can be generated using the focus error signal.

Further, in the aforesaid embodiments, the light source 2 is detachably attached to the case 11. However, in the displacement detecting device according to the present invention, the light source 2 may also be arranged at a place separated from the case 11, instead of being arranged inside the case 11, and the light may be supplied to the case 11 through an optical fiber.

With such an arrangement, the light source 2, which is a heat source, can be arranged separately from the case 11, and therefore temperature inside the case 11 can be prevented from rising. Further, by detachably attaching the light source 2 to the optical fiber, it is possible to change the light source 2 in a place separated from the case 11, so that maintainability can be improved.

Further, in the displacement detecting device according to the present invention, the light source 2 may also be arranged at a place separated from the case 11, and the outgoing light coming from the light source 2 may be supplied to the case 11 through a gas space, a liquid space or a vacuum space.

With such an arrangement, not only the light source 2, which is a heat source, can be arranged separately from the case 11, but also the member connected to the case 11, such as the optical fiber and/or the like, can be eliminated, so that no vibration is transmitted to the case 11.

Further, in the aforesaid embodiments, the light receiving section 9 directly detects the reflected light having the astigmatism generated therein by the astigmatism generator 8. However, in the displacement detecting device according to the present invention, the reflected light having the astigmatism generated therein may also be guided to the light receiving section 9 through an optical fiber.

With such arrangement, the installation position of the light receiving section 9 can be freely determined, so that the light receiving section 9 and the position information generator 10 (the focus error signal generator) can be arranged near to each other. As a result, it is possible to reduce the distance of the telecommunication, therefore increasing the response speed.

Further, in the displacement detecting device according to the present invention, an aperture may be arranged in the optical path between the objective lens 3 and the light receiving section 9, so that specific reflected light coming from the surface-to-be-measured 101 is shut off.

For example, the diffracted light (stray light) caused by foreign matter attached on the surface-to-be-measured 101 and/or unevenness of the surface-to-be-measured 101 can be prevented from being incident on the light receiving section 9. As a result, it is possible to precisely control the sum signal of the amount of the light received by the light receiving elements 21 to 24 with respect to the defocus amount of the objective lens 3.

Further, in the displacement detecting device according to the present invention, a light-scattering body (for example, frosted glass or the like) may be arranged in the optical path between the polarizing beam splitter 15 and the light receiving section 9.

With such an arrangement, it is possible to obtain a uniform light intensity distribution in a cross section perpendicular to the optical axis direction of the reflected light incident on the light receiving section 9, and therefore the influence of the surface roughness of the surface-to-be-measured 101 can be reduced.

Further, if the aforesaid light-scattering body is vibrated at a frequency of 1 kHz, for example, to variously change the scattering direction, speckle on the light receiving elements 21 to 24 will be averaged, and therefore speckle contrast can be reduced.

Further, the surface-to-be-measured 101 may be subjected to a mirror processing for reflecting the outgoing light emitted from the light source 2. By performing such processing, it is possible to obtain the position information from a signal having higher S/N ratio.

Further, diffraction gratings may be formed in the object-to-be-measured which has the surface-to-be-measured, the diffraction gratings reflecting the light having the same wavelength as the outgoing light emitted from the light source 2. It is preferred that the such a surface-to-be-measured is measured by a displacement detecting device configured by combining the displacement detecting device of the aforesaid embodiments with a so-called "linear scale" for receiving the diffracted light to detect the position in the surface direction. With such an arrangement, it is possible to detect three-dimensional displacement.

Further, in the case of forming the diffraction gratings in the object-to-be-measured, a reflective film for reflecting the outgoing light coming from the light source 2 may be formed on the surface of the diffraction gratings so that the reflective film serves as the surface-to-be-measured. The displacement detecting device of the aforesaid embodiments detects the reflected light coming from the surface-to-be-measured formed by the reflective film, and thereby detects the displacement in the height direction. At this time, since there is no diffracted light caused by the diffraction gratings in the outgoing light emitted from the light source 2, it is possible to accurately detect displacement. Incidentally, the linear scale detects the diffracted light and the like by using the light source transmitted through the reflective film.

Further, the surface-to-be-measured formed by the reflective film may also be arranged on the rear side of the diffraction gratings. In such a case, the light emitted from the light source 2 is transmitted through the material forming the diffraction gratings, and the light used by the linear scale becomes diffracted light caused by the diffraction gratings.

What is claimed is:

1. A displacement detecting device comprising:
   a light source;
   an objective lens configured to condense light emitted from the light source toward a surface-to-be-measured;
   a separation optical system configured to separate an optical path of light reflected from the surface-to-be-measured from an optical path of the light emitted from the light source;
   a condenser configured to condense the light reflected from the surface-to-be-measured;
   an astigmatism generator configured to generate astigmatism in light condensed by the condenser;
   a light receiving section configured to detect an amount of the light output by the astigmatism generator; and
   a position information generator configured to generate position information of the surface-to-be-measured using a focus error signal obtained based on the amount of light detected by the light receiving section,
   wherein the condenser, the astigmatism generator, and the light receiving section are configured so that the value of the focus error signal is equal to "0" when a focus of light condensed by the objective lens is located outside of the surface-to-be-measured and displaced from a front side or a back side of the surface-to-be-measured by a predetermined amount.

2. The displacement detecting device according to claim 1, further comprising:
   a moving mechanism configured to move any one of the condenser, the astigmatism generator and the light receiving section in the optical axis direction.

\* \* \* \* \*